Aug. 11, 1964 J. L. HOLSINGER ETAL 3,144,579

TWO GUN STORAGE TUBE UTILIZING PULSE CIRCUITRY

Filed May 10, 1961

2 Sheets-Sheet 1

INVENTORS.
JERRY L. HOLSINGER
NELSON E. HOAG
BY John J. Goodwin
ATTORNEY

Aug. 11, 1964 J. L. HOLSINGER ETAL 3,144,579

TWO GUN STORAGE TUBE UTILIZING PULSE CIRCUITRY

Filed May 10, 1961 2 Sheets-Sheet 2

INVENTORS.
JERRY L. HOLSINGER
NELSON E. HOAG
BY John J. Goodwin
ATTORNEY

United States Patent Office 3,144,579
Patented Aug. 11, 1964

3,144,579

TWO GUN STORAGE TUBE UTILIZING PULSE CIRCUITRY

Jerry L. Holsinger, Lafayette, and Nelson E. Hoag, Fort Wayne, Ind., assignors to International Telephone and Telegraph Corporation, Nutley, N.J., a corporation of Maryland Filed May 10, 1961, Ser. No. 109,082
10 Claims. (Cl. 315—13)

The present invention relates to storage tubes, and more particularly to an improved input circuit for a direct view storage tube.

In the transmission of video information over voice frequency telephone circuits, the video bandwidth is relatively narrow, being in the order of 2 kc. or less. Because of the narrow bandwidth, the rate of transmission must be reduced, so that if resolution capabilities of 300 to 400 lines are desired of the video picture the frame time, or time for one complete picture, is in the order of one to two minutes and is generally referred to as slow scan television. With frame times of this magnitude it is not feasible to use long persistence phosphor cathode ray tubes, or even direct view storage tubes unless their view time can be appreciably extended.

Another problem encountered in the application of direct view storage tubes to slow scan television is the requirement for coupling video information having frequency components of less than 1 c.p.s. to a writing gun control grid which is typically at a D.C. potential of —1 kv. or greater. Coupling of such low frequency video to the tube grid would require a high voltage capacitor having a large value of capacity.

Another condition encountered in the operation of the direct view storage tube which tends to reduce viewing time is the interaction of the flood beam with the writing beam and/or the stray gas molecules within the tube.

Accordingly, an object of the present invention is to provide an improved direct view storage tube circuit for extending the viewing time of the tube so it may be applicable for slow scan television operation.

In accordance with the aforesaid object, a direct view storage tube circuit is provided wherein the flood beam of the tube is pulsed in synchronism with the tube writing beam, and the video signal is modulated on a square wave carrier and applied to the writing beam gun via a small coupling capacitor.

The present invention is explained with reference to the drawings in which.

Before discussing the drawings it may be remarked that in order to realize the desired object of the present invention, that is, extending the viewing time of a direct view storage tube, the basic techniques that are employed are the pulsing of the flood beam in synchronism with the writing beam; modulating the low frequency video signal onto a square wave carrier prior to applying it to the writing gun, providing the square wave video carrier with a variable duty cycle to provide constant intensity and contrast control settings when different frame times are used; and providing a variable flood beam duty cycle to provide brightness and viewing time control.

The technique of pulsing the flood beam of a direct view storage tube to extend viewing time is known in the art. Viewing time is limited by the build up of positive ions on the insulator within the storage tube. These ions are generated by the electrons of the flood beam striking stray gas molecules in the tube. Pulsing the flood beam on and off will reduce the number of ions that will be generated by a factor proportional to the reduction in the flood beam duty cycle, and will thereby extend the viewing time.

Merely pulsing the flood beam, however, is not sufficient to provide maximum view time because of the interaction of the writing beam and the flood beam. When the writing beam, in writing a new signal on the insulator, passes through the flood beam, it will be deflected due to the large quantity of flood electrons repelling the electrons of the writing beam. Thus, if as the writing beam is being deflected for a scan line the flood beam is pulsed on and off, an undesired and unacceptable deflection of the writing beam will occur. This difficulty has been overcome in the present invention by synchronizing the square wave video carrier signal and the flood pulsing signals. In the present invention, when the writing beam is pulsed on, the flood beam will be off, which means that there will be no interaction of the flood beam with the writing beam.

Figure 1:
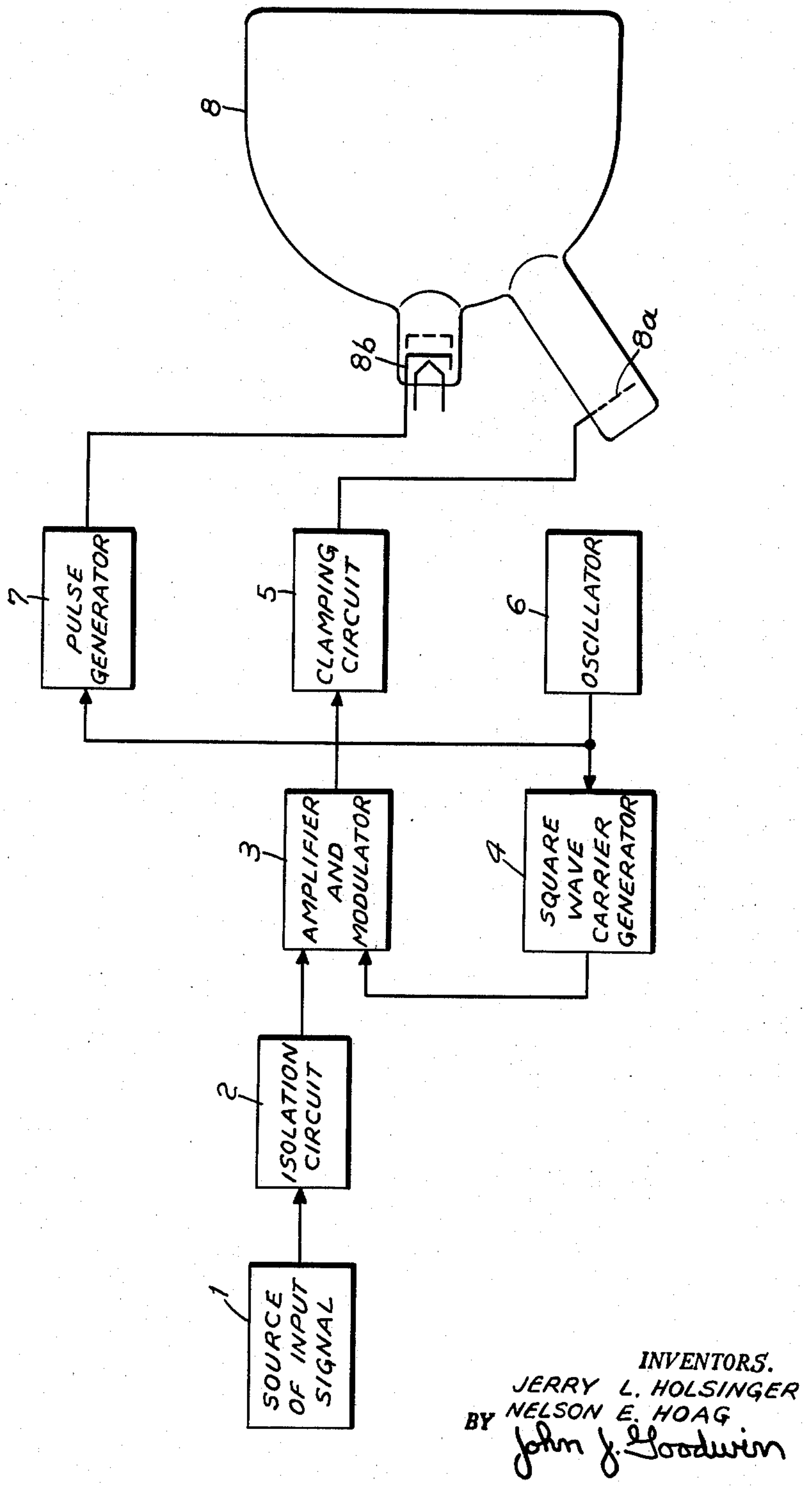
FIG. 1 is a block diagram of a preferred embodiment of a direct view storage tube circuit following the principles of the present invention.

Referring now to FIG. 1, a block diagram of a preferred embodiment of the present invention is shown comprising a source of input signal 1, an isolation circuit 2, an amplifier and modulator 3, a square wave carrier generator 4, a clamping circuit 5, an oscillator 6, a pulse generator 7, and a direct view storage tube 8.

Direct view storage tube 8 may be any direct view storage tube utilizing writing and flood guns with charge storage on an insulator, for example the Iatron manufactured by the ITT Laboratories. Storage tube 8 is shown schematically, with only those portions shown which are necessary to describe the present invention.

Source of input signal 1 provides a 0 to —3 volt video signal having a frequency range in the order of 1 c.p.s. to 2 kc. The video signal from source 1 is applied through an isolation circuit 2, for example an emitter follower circuit, to an amplifier-modulator 3. A square wave carrier signal from generator 4 is also applied to amplifier-modulator 3 and the video signal is modulated onto the square wave carrier signal. The modulated output signal from amplifier-modulator 3 is coupled to clamping circuit 5, which clamps the square wave at a D.C. potential of —1 kv. The modulated, clamped signal is then directly applied to the control grid 8*a* which is associated with the writing beam cathode of tube 8, thereby providing the writing beam with the video information to be written and viewed.

Pulse generator 7 is coupled to the flood cathode 8*b* of tube 8 and provides for pulsed operation of the flood beam. Both square wave carrier generator 4 and pulse generator 7 are coupled to master oscillator 6. Master oscillator 6 provides synchronizing signals for both generators 4 and 7 and therefore the tube writing beam and flood beam will operate in synchronism.

Figure 2:
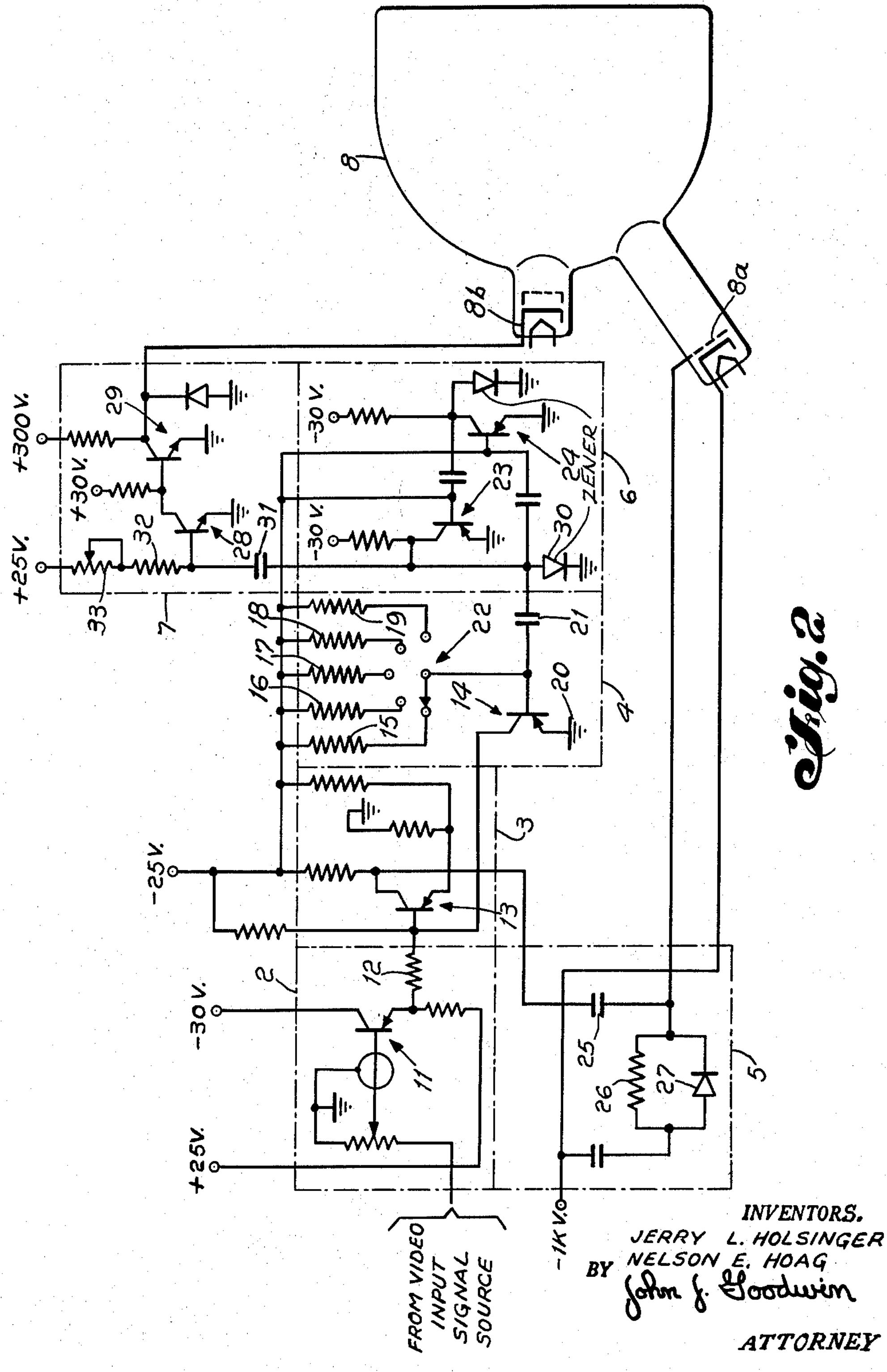
FIG. 2 is a schematic diagram of the preferred embodiment shown in FIG. 1.

A more specific understanding of the operation of the present invention may be obtained by referring to FIG. 2. Isolation circuit 2 includes a transistor emitter follower 11. The video signal from the input signal source is applied to the base of transistor emitter follower 11 for purposes of isolation. The output signal from emitter follower 11 is applied to modulator-amplifier 3 via resistor 12.

Modulator-amplifier 3 includes transistor 13, which is operated as a common emitter amplifier with a gain, in the present embodiment, of approximately 7. Square wave carrier generator 4, including a PNP transistor 14 and a bank of resistors 15 through 19 is also coupled to the base of transistor 13 of modulator-amplifier 3. Transistor 14 operates basically as a switch which either short circuits the base of transistor 13 to ground potential 20 or permits it to assume a potential dependent on the video input signal. Thus, when transistor 14 is "off" (not conducting) transistor 13 functions as an amplifier and the signal at its output collector depends on the video signal from transistor 11, and when transistor 14 is "on" (conducting) transistor 13 is grounded and its output is to the negative battery potential which is, in this example, negative 25 volts. The output of transistor 13 therefore varies between —25 volts and some less negative voltage when transistor 14 goes from "on" to "off." A less negative (or more positive) signal, when applied to the control grid of a direct view storage tube will increase the writing beam current thereof, so it is seen that the storage tube writing beam can be turned on by the turning off of transistor 14. The operation of transistor 14 is controlled by resistors 15 through 19, capacitor 21, and oscillator 6. A positive going signal from oscillator 6 applied to the base of transistor 14 will turn transistor 14 off, and the duration of the "off" time will then depend on the time constant established by capacitor 21 and the one of resistors 15 through 19 selected through switch 22. The resistors 15 through 19 are chosen such that, in combination with capacitor 21, on-time writing beam duty cycles ranging between 50 percent and 10 percent are available. Switch 22 is the frame rate switch, and is set to maintain the intensity and contrast of the storage tube substantially constant regardless of the sweep (frame time) mode selected.

Oscillator 6 includes a transistor multivibrator having transistors 23 and 24. The operation of oscillator 6 is conventional in that the collectors of transistors 23 and 24 reciprocally switch between negative potential and ground potential at a frequency of approximately 10 kc. Oscillator 6 is designed such that the collector of transistor 23 will switch between ground potential and a negative 5 volts established by the negative battery and zener diode 30. When the collector of transistor 23 goes positive from —5 volts to ground, the positive going pulse will be applied to the base of transistor 14 via capacitor 21, turning transistor 14 off. The collector of transistor 23 will return to ground, but time constant of capacitor 21 with a selected one of the resistors 15 through 19 is shorter in time than the interval at which the collector of transistor 23 is at ground potential. Therefore, when capacitor 21 has discharged back to ground potential through the selected one of resistors 15 through 19, transistor 14 will be turned on again. Thus as transistor 13 is controlled by the operation of transistor 14, it is seen that the periodicity at which the video signal is conducted through transistor 13 is determined by oscillator 6 and the duty cycle of the conduction is determined by capacitor 21 and a selected one of resistors 15 through 19.

The modulated video signal output from transistor 13 is applied, via capacitor 25, to a D.C. clamping circuit including resistor 26 and diode 27. The clamping circuit serves to maintain the bottom portions of the modulated square wave signal at a D.C. potential of —1 kv. The top portion of the square wave, of course, varies in accordance with the video signal. The modulated square wave, being clamped at —1 kv., may be applied directly to the control grid 8*a* associated with the writing beam electrode of the storage tube. The upper frequency limit of the video signal is approximately 2,000 c.p.s. while the frequency of the square wave carrier is, as was stated, 10 kc. The frequency of the carrier is well above the writing beam sweep frequency, so that the pulsing of the writing beam is not observable to the viewer. It is to be also noted that, the carrier frequency being relatively high, a small, low valued capacitor 25 may be employed for coupling rather than the large, high valued capacitor required to couple the relatively low frequency unmodulated video signal heretofore.

It was stated hereinabove that an undesired condition occurs when the flood beam is operated in the presence of the writing beam, the pulsed flood beam produces layers of electron clouds. As the writing beam passes through these electron layers, deflection of the writing beam occurs, causing distortion. It was also stated that a technique for extending viewing time is to pulse the flood beam to reduce ionization, thus extending the viewing time proportional to the flood beam duty cycle. In the present invention the flood beam is pulsed synchronously with the square wave carrier, so that the flood beam is off when the writing beam is on, thereby avoiding interaction between the beams. The positive going output pulse from oscillator 6 produced when the collector of transistor 23 goes from negative to ground potential controls the occurrence of the square wave carrier. This positive output pulse is also applied to the input of pulse generator 7.

Pulse generator 7 includes transistors 28 and 29. Transistor 28, being an NPN transistor, will be turned "on" by the positive going pulse from the collector of transistor 23. It is noted that the operation of transistors 14 and 28 are reciprocal, transistor 14 being turned off and transistor 28 being turned on by the positive going pulse from oscillator 6. When transistor 28 is "on" transistor 29 is turned "off," and when transistor 29 is "off" its collector rises to approximately 120 volts D.C. and biases off the flood cathode 8*b*. Thus, the flood beam is turned off when the writing beam is turned on. The "off" time of transistor 28 is determined by a time constant circuit consisting of capacitor 31, resistor 32, and variable resistor 33. Variable resistor 33 enables the duty cycle of the flood beam to be adjusted in accordance with the frame time being employed. The writing beam time constant circuit (capacitor 21, resistors 15–19) and flood beam time constant circuit (capacitor 31, resistors 32 and 33) are also adjusted such that the flood beam remains off while the writing beam is on, and vice versa.

As an alternative operation, with slight modification to the present circuit, it would be possible to synchronize the flood and writing beams so that they are turned on and off at same time. This would not be as advantageous as turning the flood beam off when the writing beam is turned on, and vice versa because there would be interaction between the flood and writing beam, but the interaction would be constant over the writing cycle and would not be as objectionable as with non-synchronous operation.

Applicants have observed that the application of a direct view storage tube circuit as described, the viewing time of a typical Iatron may be extended to as high as ten minutes. Further advantages of the present invention includes simultaneous viewing and writing, provision for varying the characteristics of the tube so that different frame times may be used without affecting normal settings of intensity and contrast, and a large capacitor is not required for coupling the video signal to the writing beam control grid.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit for use with a storage tube of the type having means forming a separate writing beam responsive to video information signals and a separate flood beam comprising means to periodically pulse said writing beam on and off at a given frequency, and means to periodically pulse said flood beam on and off at said given frequency in opposite phase with said pulse writing beam.

2. A circuit as set forth in claim 1 wherein said writing beam and said flood beam pulsations are in the form of square waves.

3. A circuit as set forth in claim 2 wherein said square wave writing beam pulses have said video information signals modulated thereon.

4. A circuit as set forth in claim 3 wherein the given frequency of said writing beam square wave pulses is greater than the frequency of said video information signals.

5. A circuit for use with a storage tube of the type having separate writing and flood beam forming means for displaying input signal information comprising a source of pulsed carrier signal, means to modulate said input signal information onto said carrier signal, means applying said modulated carrier signal to pulse said writing beam on and off, and means applying a signal to pulse said flood beam on and off in synchronous time relation with said writing beam.

6. A storage tube circuit comprising a storage tube of the type having separate writing and flood beam electron guns for displaying input signal information, a source of timing signal, first means responsive to said timing signal to produce a pulsed carrier signal, means to modulate said input signal onto said pulsed carrier signal, second means responsive to said timing signal to produce a control signal, said modulated carrier signal and said control signal being in synchronous time relation, means applying said modulated carrier signal to pulse said writing beam gun on and off, and means applying said control signal to pulse said flood beam gun on and off such that the writing beam and the flood beam operate in alternating time relation.

7. A storage tube circuit comprising a storage tube of the type having separate writing and flood beam control electrodes for displaying relatively low frequency input signal information, a source of timing signal, first means responsive to said timing signal to produce a relatively high frequency pulsed carrier signal, means to modulate said relatively low frequency input signal onto said relatively high frequency pulsed carrier signal, means applying said modulated square wave carrier signal directly to said writing beam control electrode to periodically pulse the writing beam on and off, second means responsive to said timing signal to produce a pulsed control signal of the same frequency and of opposite phase to said carrier signal, and means applying said control signal to said flood beam control electrode to periodically pulse the flood beam off and on in opposite phase to said writing beam operation.

8. A storage tube circuit comprising a direct view storage tube having writing and flood beam electrodes for displaying slow scan video signal information, an isolation circuit responsive to said video input signal; an oscillator for producing time spaced output pulses, a square wave carrier generator responsive to said pulses from said oscillator for producing a square wave carrier signal, a modulator responsive to said video signal from said isolation circuit and said square wave carrier signal from said generator to modulate said video signal onto said square wave carrier signal, a clamping circuit for applying said modulated square wave carrier signal to said writing beam electrode for periodically pulsing the writing beam, a pulse generator responsive to the pulses from said oscillator for producing square wave pulses equal in frequency and opposite in phase to said square wave carrier signal, and means to apply said square wave pulses from said pulse generator to said flood electrode for periodically pulsing the flood beam at a frequency equal to and at a phase opposite to said pulsed writing beam.

9. A storage tube circuit comprising a direct view storage tube for displaying slow scan video signal information, said tube being of the type having a writing beam cathode and a flood beam cathode and associated electrodes, an emitter follower transistor responsive to said video signal, a multivibrator oscillator for producing time spaced output pulses, a common emitter transistor amplifier responsive to said video signal from said emitter follower, a first transistor switch coupled to said multivibrator and said amplifier to ground the video signal from said amplifier in response to timing pulses from said multivibrator, thereby modulating said video signal onto a square wave carrier signal, a diode clamping circuit to clamp said modulated square wave carrier signal from said amplifier at a predetermined potential, means to apply said clamped modulated square wave carrier signal to said electrode associated with said writing beam for producing periodic pulsations of said writing beam, a second transistor switch coupled between said multivibrator and said flood beam cathode to pulse the flood beam in response to said time spaced signals from said multivibrator, said pulsed flood beam and said pulsed writing beam being in phase-opposed synchronism.

10. A storage tube circuit according to claim 9 wherein the period of said writing beam pulsations and the period of said flood beam pulsations may be adjusted by variable resistance means associated with said first and second transistor switches respectively.

References Cited in the file of this patent

UNITED STATES PATENTS

| | | |
|---|---|---|
| 2,843,798 | Hook | July 15, 1958 |
| 2,843,799 | Hook | July 15, 1958 |
| 2,862,139 | Williams et al. | Nov. 25, 1958 |